Jan. 9, 1973  B. HYCA  3,709,759
DEVICE FOR REPAIRING PUNCH TAPE PROVIDED
WITH CODE HOLES AND FEED HOLES
Filed Feb. 9, 1971  7 Sheets-Sheet 4

INVENTOR:
Bohumil HÝČA
BY: Arthur O. Klein
ATTORNEY

Jan. 9, 1973  B. HYCA  3,709,759
DEVICE FOR REPAIRING PUNCH TAPE PROVIDED
WITH CODE HOLES AND FEED HOLES
Filed Feb. 9, 1971  7 Sheets-Sheet 7

INVENTOR:
Bohumil HÝCA
BY:
Arthur O. Klein
ATTORNEY

United States Patent Office 3,709,759
Patented Jan. 9, 1973

3,709,759
DEVICE FOR REPAIRING PUNCH TAPE PROVIDED WITH CODE HOLES AND FEED HOLES
Bohumil Hyca, Vanurova, Czechoslovakia, assignor to Zbrojovka Brno, Narodni podnik, Brno, Czechoslovakia
Filed Feb. 9, 1971, Ser. No. 113,952
Claims priority, application Czechoslovakia, Feb. 12, 1970, 98,170/70; Oct. 10, 1970, 7,136/70
Int. Cl. B31f 5/06; K03d 15/04
U.S. Cl. 156—506                                7 Claims

ABSTRACT OF THE DISCLOSURE

A device for splicing or repairing punch tapes, and subsequently repunching the splice. The device comprises a base, at least two guide pins for the feed holes of the punch tape, holders for the punch tape on the base, a trimming die of code holes and feed holes of punch tape on the base, a tiltable plate with guide holes for the holes of the trimming die engaging with a hand punch for punching the code holes and at least one punch for punching the feed holes. The trimming die comprises a transverse slot along each side of which at least one row of holes are disposed for punching the code holes and feed holes of the punch tape, while the spacing between both rows of holes placed next to the transverse slot equals the spacing of characters on the punch tape or its full multiple.

---

The invention relates to a device for repairing punch tapes, e.g. by sticking torn punch tapes together by a strip of adhesive tape and subsequently repunching the splice, by sticking two pieces of punch tape or one tape into a closed loop, and by correcting improperly punched characters and the like.

When repairing a punch tape the following four operations can occur, the order and the number of which can differ in individual cases, i.e.:

(1) Cutting the tape, i.e. making the edges of two ends of a punched tape even, so as to allow them to be set together precisely with the required spacing of characters given by the spacing of feed holes in the two ends;

(2) Splicing the tape, i.e. an operation in which either the torn tape or two previously cut ends of a punch tape are set together and fastened by a piece of adhesive strip, while the excess portions of the adhesive strip are clipped off;

(3) Covering the holes of an improper character or characters, in which one or more improper characters are covered by an adhesive strip the unwanted ends of which are clipped off; and (4) Punching, in which the spliced or the covered spot of the tape is punched anew, or a vacant spot of a punch tape is punched.

Devices for repairing punch tape are generally known which, however, provide only for some of the above fundamental operations as a rule, while the punch tape must be brought to a different place any time the next operation is to be carried out.

Those known devices have the disadvantages that the repair of the punch tape is complicated, and the time required for the repair is longer because of the necessity of taking out the tape and inserting it at some other working place after every single operation has been carried out. These disadvantages make themselves felt particularly when the device for repairing punch tape forms part of a complex of devices for the cutting and correcting of information stored in a punch tape.

The above disadvantages are substantially avoided by the device for repairing punch tape according to this invention. In an illustrative embodiment of such device, there is provided a transverse slot in a trimming die along each side of which at least one row of holes is disposed for punching the code holes and the feed holes of a punch tape. The spacing or pitch between the two rows of holes placed next to the transverse slot equals the spacing of characters of a punch tape or its full multiple. A guide is placed at at least one end of the base in its longitudinal direction. A source of light is placed under the trimming die. An electroluminescent panel serves as a light source. A drawer made of translucent material is placed under the trimming die. A sliding member is slidably adjusted under the trimming die and bears guiding pins which project into oblong openings in the trimming die, the path of the sliding member being limited by at least one adjustable stop, and the plate with guiding holes being provided with fixing holes for guiding pins. At one side of the base there is a common pin with a swingably arranged plate carrying guiding holes for the holes of the trimming die, auxiliary holders for the punch tape being tiltably arranged at both sides of the plate on a common pin.

A spring provided thrust element is tiltably arranged on one of the holders. The base is provided with catches to fix the position of holders. On a pin which is rotatably arranged in the side of the base there is arranged at least one cutter the edge of which overlaps the diameter of the guiding rollers which are rotatably located on a pin on both sides of the cutter. Each roller is provided by a collar, the distance between said collars corresponding to the width of the adhesive strip which is unwound from the adhesive strip holder and fed over the guiding rollers between the trimming die and the plate with guiding holes.

A control wheel with a resilient pawl is fixed at the end of the pin. The cutter is fixed at a common pin rotatably located at the side of the base. The bearing faces of the holders are coated with a layer of resilient material. The width of the trimming die corresponds to edges for the clipping cutters of the adhesive strip. At each side of the trimming die there is arranged at least one guiding angle plate for the clipping cutter. A sliding member is slidably located under the trimming die, at the sides of said sliding member there being fixed clipping cutters bearing against the side edges of the trimming die. A lever is tiltably mounted on the base, while a holder provided with a cutter the edge of which is oriented into the transverse slot of the trimming die is mounted on the lever.

The plate with the guiding holes for the holes of the trimming die is swingably arranged on one holder. The lever carries a thrust member which is spring biased with respect to the lever, while the edge of the cutter enters the elongated slot of the thrust member. The plate with guiding holes for the holes of the trimming die is fixed on a swingable lever which carries clipping cutters for the adhesive strip at its sides. The thrust member is provided with a transverse slot into which the edge of the cutter projects, guiding holes for the holes of the trimming die being formed at both sides of the transverse slot. The punches are accommodated in the guiding holes of the holes which serve to punch the feed holes of the punch tape. The punches are fixed in a plate with low axial and radial clearance and are held by a shim against dropping out.

One of the major advantages of the device according to the invention consists in that it allows all necessary operations to be carried out in an arbitrary order in one place, i.e. without taking out and transferring the punch tape. Another advantage resides in the fact that the device allows the determination of which hole has already been punched and which not, without the necessity of swinging out the trimming die. Also, it allows repairs of a punch tape to be carried out provided its axis of the row of code openings does not coincide with the axis of the feed holes. The whole device can, with advantage, be included into a complex equipment serving to cut and correct the information registered in the punch tape.

An embodiment of the device for repairing punch tape according to the invention is illustrated by way of example in the accompanying drawings which form part of this application and in which:

FIG. 3b is transverse section taken along line 3b—3b in FIG. 3a;

In the first illustrative embodiment of the device, shown in FIGS. 1, 2, 3a, and 3b, the base 1 is made of sheet metal bent into the form of the letter U turned upside down and fixed by means of screws 2 to a bottom 3, made, e.g. of wood. In the middle of the top face of base 1 a trimming die 5, 6 (FIG. 2) is fixed by means of screws 4, said die consisting of two parts, 5 and 6, which are set together so as to form slot 7 disposed transverse to the length of the base 1. The width of slot 7 is proportional to the thickness of the cutting edge of a cutter (not there illustrated) which is a razor blade as a rule, i.e. about 0.1 mm. In both parts of the trimming die 5, 6, i.e. at both sides of the transverse slot 7 there are formed a few rows of openings; such openings contain on the one hand, holes 8 for punching the feed holes 8' in tape 10, and, on the other hand holes 9 for punching the code holes 9' in punch tape 10. The spacing between the two rows of holes 8, 9 which are disposed next to the transverse slot 7 on both its sides equals the spacing between successive characters in punch tape 10 or its full multiple. The width of the longitudinally central parts of trimming dies 5, 6 equals the width of punch tape 10.

Figure 2:
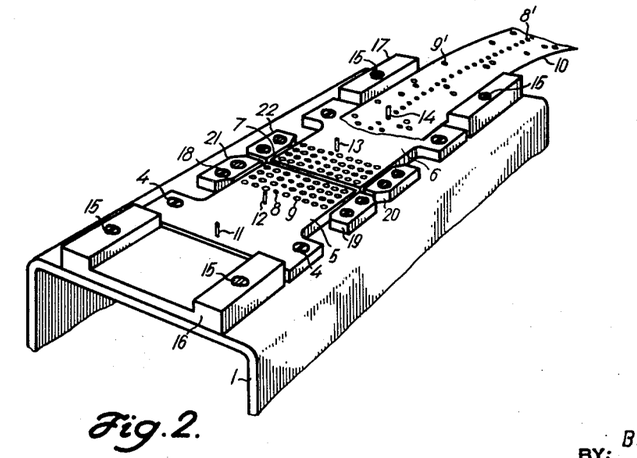
FIG. 2 is a perspective view of the base with the trimming die and the guides for the punch tape.

In both parts 5, 6 of the trimming plates or dies there are fixed guiding pins 11, 12, 13, 14, such pins having a diameter corresponding with the diameter of feed holes 8' in punch tape 10. The spacing between the guiding pins 11, 12, 13, 14 corresponds to a full multiple of the spacing between two adjacent rows of holes 8, 9; all guiding pins 11, 12, 13, 14 lie along a common row of holes 8 on the trimming die. At both ends of base 1, in its longitudinal direction, there are mounted by screws 15 guides 16, 17 for the rough guiding of punch tape 10. Guiding angle plates 19, 20, 21, 22 are fixed by means of screws 18 at both sides of the trimming die.

Figure 1:
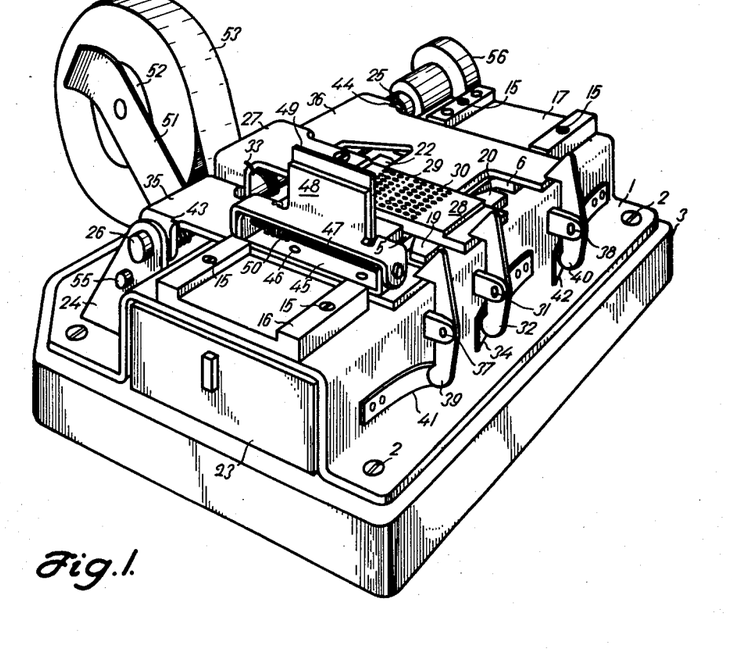
FIG. 1 is a general perspective view of a first embodiment of device according to the present invention.

In base 1 under the trimming die in an opening (not illustrated) is formed under which, in the space produced by a band of the base 1, a drawer 23 (FIG. 1) is placed; drawer 23 serves to accumulate scrap resulting from punching the punch tape 10. At the side of base 1 two brackets, of which one is shown at 24 in FIG. 1, are placed, such brackets bearing a common rotatable pin 26 extending along the base 1. A lever 27 is swingably mounted upon the middle portion of pin 26. To the end of lever 27 there is fixed plate 28, plate 28 being shown in horizontal position in FIG. 1. Plate 28 is provided with guiding holes 29 for holes 8 of the trimming die for punching the feed holes 9'. Plate 28 is also provided further with guiding holes 30 for holes 9 of the trimming die for punching the code holes 9'. At the other side of base 1 on a pin 31 a catch 32 is swingably arranged, catch 32 being pushed by means of a leaf spring 34 into locking engagement with the free end of plate 28. Plate 28 is thus held horizontal against the action of a torque spring 33 wound around the common pin 26, spring 33 urging plate 28 counterclockwise (FIG. 1). At both sides of lever 27 at the common pin 26 the punch tape holders 35, 36 are swingably arranged. At both sides of catch 32, on pins 37, 38, two further catchers 39, 40 are swingably arranged, catches 39, 40 being pushed into locking engagement with holders 35, 36 by leaf springs 41, 42 against the action of coil torque springs (not shown) on common pin 26.

On holder 35 there is affixed a bearing 45 by means of screws 46; bearing 45 serves to accommodate a pin 47 which lies parallel with the transverse slot 7. A thrust member in the form of a plate 48 with a guiding edge 49 is swingably mounted on pin 47. The thrust member 48 is held in its swung out position by a torque coil spring 50 carried by the pin 47. In the swung down position of plate 48 the guiding edge 49 is placed next to the transverse slot 7. At the same side of the base 1 on which the common pin 26 is mounted there is fixed a holder 51 in front of the lever 27, said holder carrying a roll 52 of adhesive tape 53. The adhesive tape 53 is fed over a roller 54 rotatably mounted on a pin 55 (FIG. 3a) fixed by brackets of which one is shown at 24, and further over an adjustable cutter for cutting the adhesive tape 53 in a longitudinal direction. The free end of adhesive tape 53 projects between the trimming die 5, 6 and the plate 28 provided with guiding holes 29, 30.

Figure 3A:
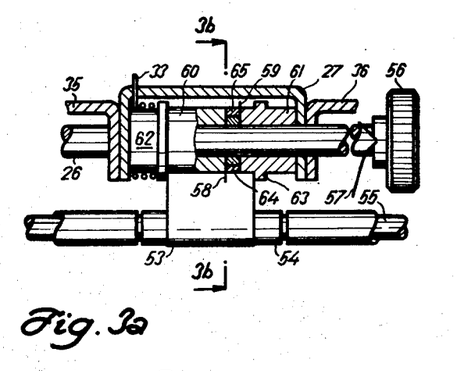
FIG. 3a is a view in partial longitudinal section of the adjustable cutter for the adhesive strip.
Figure 3B:
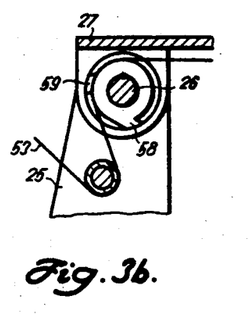

The adjustable cutter is arranged under the lever 27 on the common pin 26 (FIGS. 3a, 3b). At the protruding end of pin 26 there is affixed a control wheel 56 which is selectively brought to a stop at any one of three required positions by means of a resilient catch 57 in the form of a leaf spring. Two cutters 58, 59 are fixed to the common pin 26, the distance in the direction of the length axis of the common pin 26 between cutters 58, 59 being one or more spacings of characters on tape 10; cutters 58, 59 are held spaced by a collar or shim 64. The cutting edges of cutters 58, 59 include an angle of about 120°. At both sides of cutters 58, 59 two guiding rollers 60, 61 are rotatably arranged on the pin 26. On the guiding roller 60 there is formed a collar 62, and on the guiding roller 61 there is formed a collar 63; the distance between collars 62 and 63 equals the width of the adhesive strip 53. On shim 64 there is mounted a ring 65, the outer diameter of ring 65 corresponding to the outer diameter of the guiding rollers 60, 61. The edges of cutters 58, 59 overlap the outer diameter of rollers 60, 61.

The accessories of this embodiment of device for repairing punch tape consists of a cutter (not illustrated), e.g. a razor blade held in a holder, and two hand punches, i.e. one for punching the feed holes 8' and the other for punching the code holes 9'. For transport purposes these accessories, as well as possibly a replacement roll of adhesive tape 53, are accommodated in the drawer 23. The lower, tape-engaging surfaces of holders 35, 36 are covered by a layer of resilient material, e.g. foam polystyrene.

Figure 4:
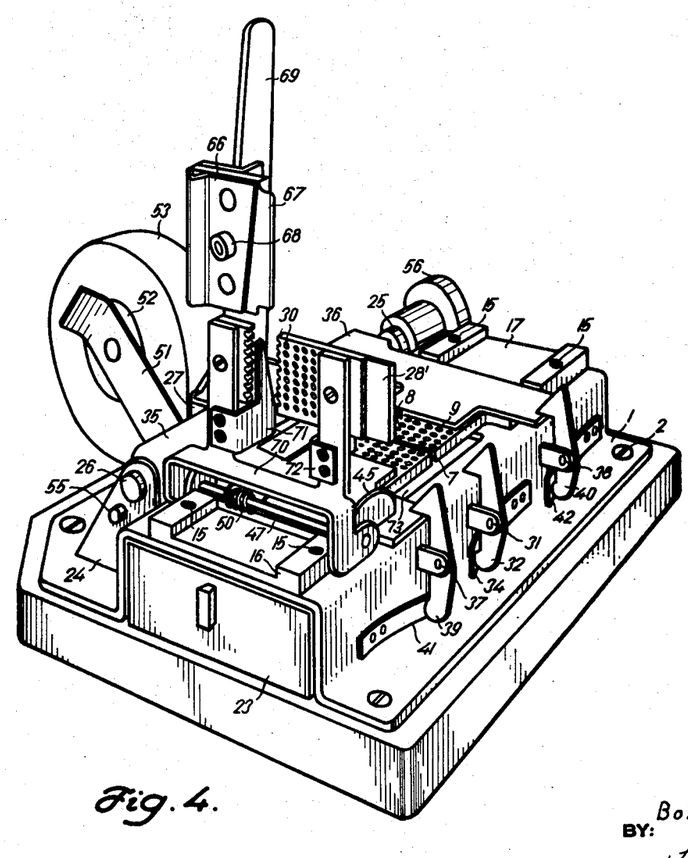
FIG. 4 is a general perspective view of a second embodiment device according to the invention.

In a second embodiment, shown in FIG. 4, a cutter holder 66 is mounted upon the lever 27, and accommodates a transverse cutter 67, i.e. a razor blade, which is fixedly held by screw and nut 68. The lever 27 terminates in a hand grip 69. The edge of the cutter 67 is disposed in the same vertical plane as the transverse slot 7. Instead of a thrust member in the form of a plate 48 as in FIG. 1, a lever 70 is swingably arranged on the pin 47 on the holder 35, said lever being connected with plate 28' with guiding holes 29, 30 adapted to be aligned with the holes 8, 9 of the trimming die. On lever 70 there are further fixed two cutters 71, 72 for clipping the adhesive tape 53, cutters 71, 72 being oriented to the rims of the trimming die and to the opening 73 under the trimming die. With the plate 28' in the swung down position, the guiding holes 29, 30 are coaxial with the adjacent holes 8, 9 of the trimming die. Since the edges of the trimming die serve as cutting edges for the adhesive tape clipping cutters 71, 72, the guiding angle plates 19, 20, 21, 22 of the first-described embodiment have been omitted in the embodiment of FIG. 4.

Figure 5:
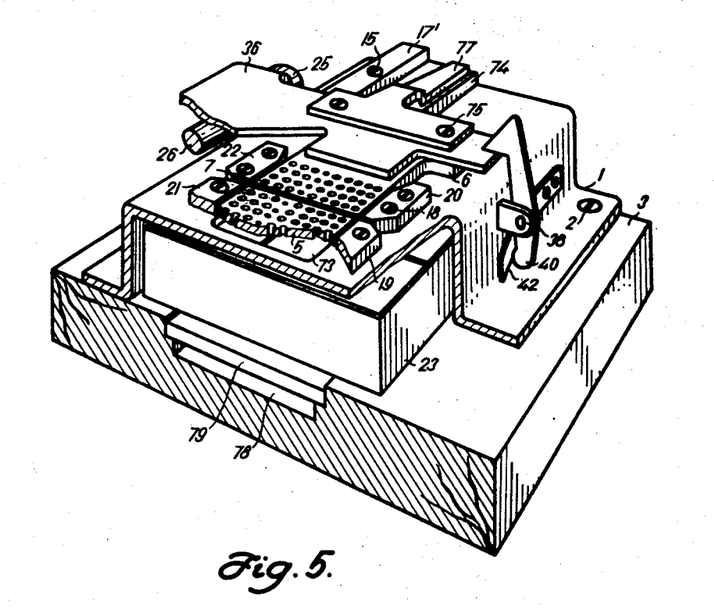
FIG. 5 is a view of a part of a third embodiment of the device with the light source and a modified guide member.

In the embodiment according to FIG. 5 the guiding member 17' is adapted to the width of a five track tape, whereas the width of the trimming die 5, 6 corresponds to the width of an eight track tape. On the guide member 17 there is a cutting edge 74. On the holder 36 for the punch tape there is affixed by means of screws 75 a member with a guiding edge 77. In the bottom plate 3 there is a recess 78 accommodating a source of electroluminescent light 79 connected with a source of electric energy (not illustrated). The source of light 79 can also be a bulb, a luminescent electric conductor, or a bulb with a prism, yet preferably is an electroluminescent panel, as shown, producing a flat surface light source. The light source 79 is placed under the opening 73 which is formed in the base 1 and under the trimming die. For this purpose the drawer 23 is made of translucent material, e.g. organic glass.

Figure 6:
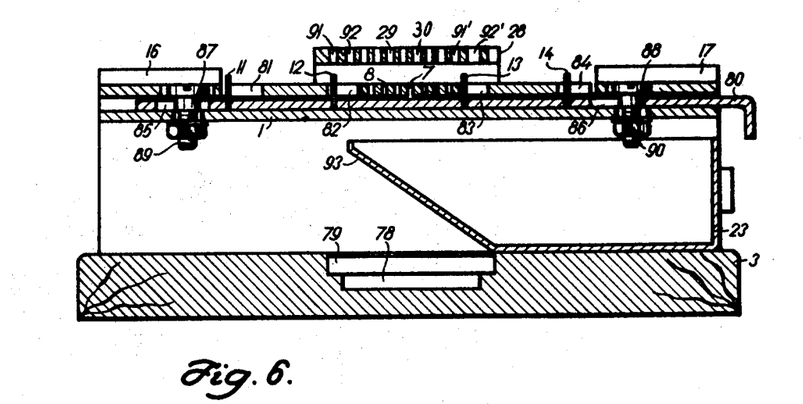
FIG. 6 is a longitudinal section of a fourth embodiment of the device; the section being taken through the hole in the female die for punching the feed holes in the tape.

In order to allow the repair of punch tapes to be made when the axis of the row of code holes does not coincide with the axis of the feed hole, the device may be made according to FIG. 6. Under the trimming die and the guide members 16, 17 there is slidably arranged a slide member 80, member 88 bearing guide pins 11, 12, 13, 14 which enter oblong openings 81, 82, 83, 84 in the trimming die. The slide member 80 has two oblong openings 85, 86 into which there enter adjustable stops 87, 88 which are fixed in base 1 by screws 89, 90. In plates 28, which is provided with guiding holes 29, 30, fixing holes 91, 91', 92, 92' are formed for the guiding pins 12, 13. The rear inner wall 93 of the drawer 23 slopes into the space of drawer 23. The sloping rear inner wall 93 of the drawer 23 is placed over the source of light 79.

Figure 7:
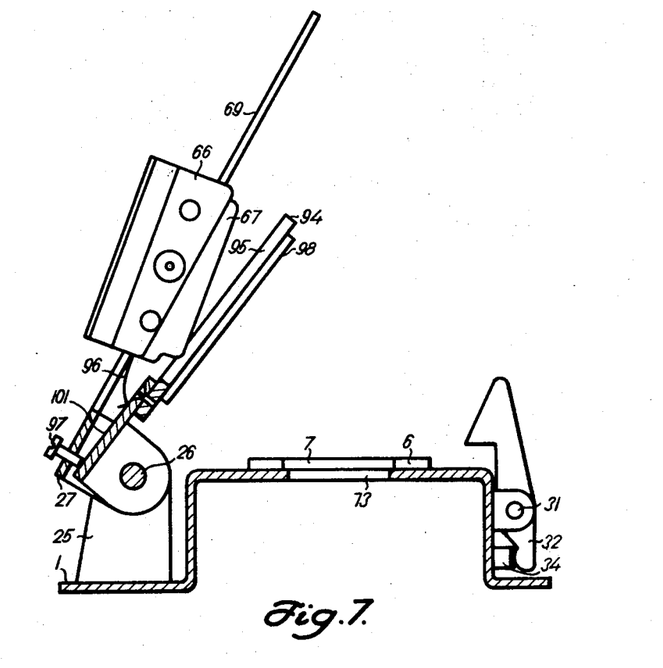
FIG. 7 is a detail of a fifth embodiment of the device showing the cutter in partial view.

A fifth embodiment, shown in FIG. 7, generally follows the aspects of an embodiment according to FIG. 4. In such embodiments, the common pin 26 carries a swingable lever 101 with a thrust member in the form of a plate 94 with an oblong slot 95 into which the edge of the cutter 67 projects. The thrust plate 94 bears against a leaf spring 96 fixed on the lever 27. A screw 97 is screwed in lever 27, such screw bearing against the lever 101 and serving to adjust the position of the thrust plate 94 with respect to the cutter 67. The working surface of the thrust plate 94 is covered by a layer of resilient material, e.g. a layer of polyurethane.

Figure 8:
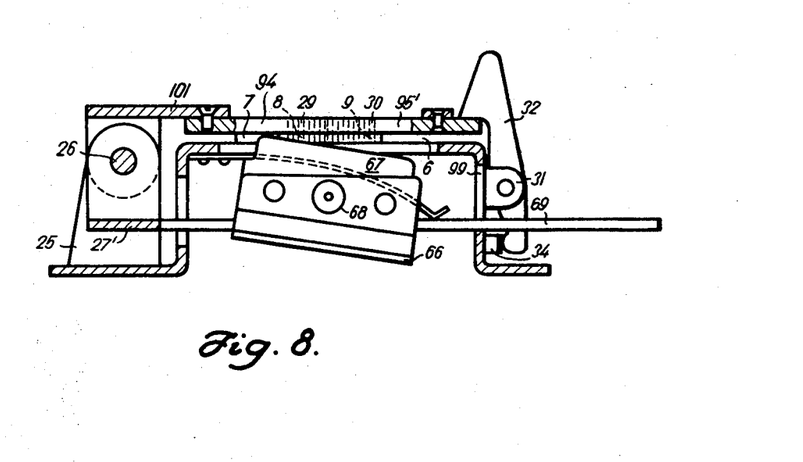
FIG. 8 is a view of a sixth embodiment of the device with the cutter being shown in partial section with a thrust member.

In the embodiment according to FIG. 8, a lever 27' is placed under the base 1 and carries a holder 66 which carries the cutter 67. The cutting edge of the cutter 67 is oriented into the transverse slot 7. The grip 69 of the lever 27' enters the opening 99 in the side of the base 1.

Figure 9:
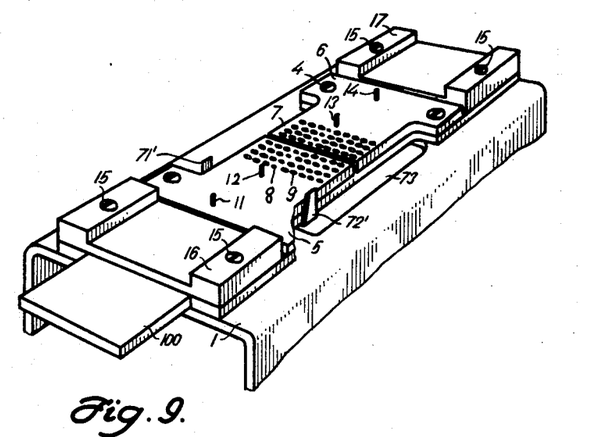
FIG. 9 is a view of a seventh embodiment of the device with a perspective view of the trimming die with an alternative arrangement of the clipping cutters for cutting the adhesive strip.

In FIG. 9 there is illustrated another arrangement of the clipping cutters 71', 72'. Under the trimming die and the guiding members 16, 17 the sliding member 100 is slidably arranged. At the side of member 100 the clipping cutters 71', 72' for the adhesive tape are fixed, such cutters bearing against the side edges of the trimming die. In this case the guiding angle plates 19, 20, 21, 22 of the first-described embodiment have been omitted.

Figure 10:
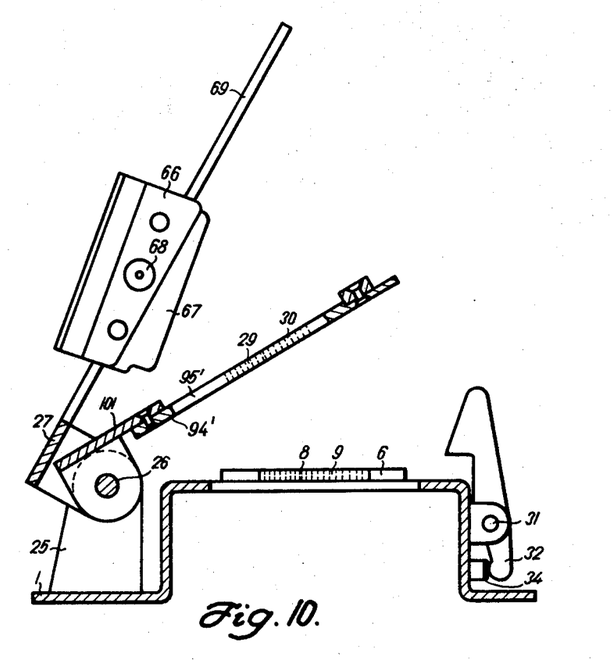
FIG. 10 is a view of an eighth embodiment of the device, the view particularly showing the cutter and the plate with guiding holes.

The embodiment according to FIG. 10 is a modification of the embodiment according to FIG. 7. At the common pin 26 the lever 27 is swingably arranged, such lever holding the holder 66 carrying the cutter 67. The cutting edge of the cutter 67 is oriented into the slot 95' of the thrust plate 94' fixed on the lever 101 which is swingably arranged on the pin 26. At both sides of the slot 95', there are formed a number of rows of the guiding holes 29, 30 for the holes 8, 9 of the trimming die.

Figure 11:
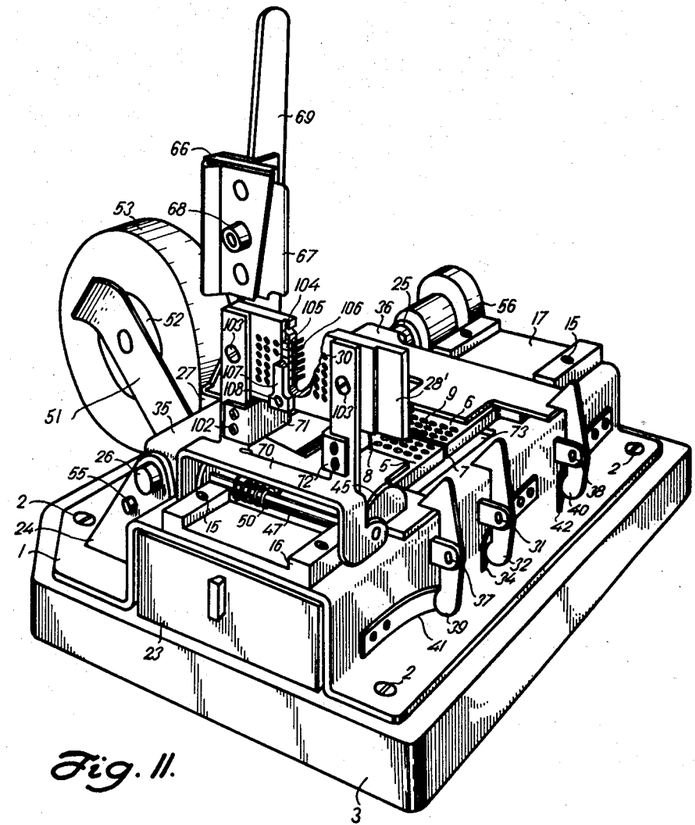
FIG. 11 is a general perspective view of a ninth embodiment of the device, such device being provided with punches according to the invention.
Figure 12:
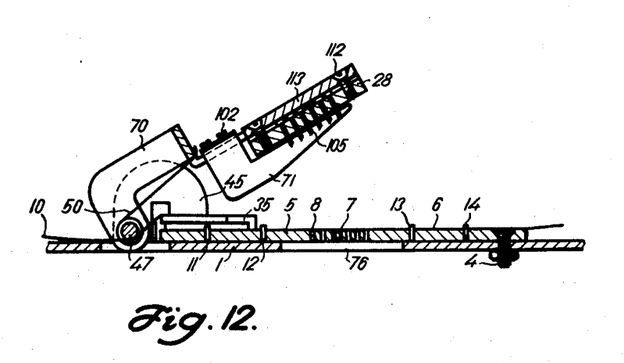
FIG. 12 is a longitudinal section of the trimming and guiding plate of the embodiment of the device according to FIG. 11.
Figure 13:
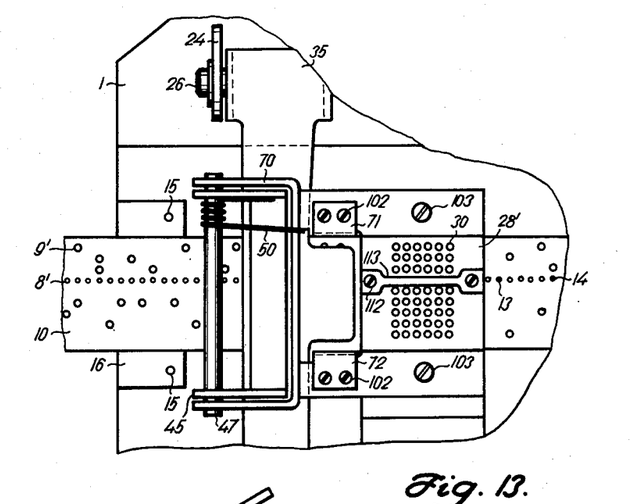
FIG. 13 is a plan view of the embodiment of the device shown in FIGS. 11 and 12.

The embodiment according to FIGS. 11, 12, and 13 is a modification of the embodiment according to FIG. 4. The base 1 is made of sheet metal bent into the form of the letter U turned upside down, and is screwed by means of screws 2 to the bottom plate 3 made, e.g. of wood. In the middle of the top face of base 1 a trimming die is fixed by means of screws as in FIG. 2. The die consists of two parts, 5 and 6, which are set together so as to form a gap 7 leading across the base 1. The width of gap 7 is proportional to the cutting edge of the cutter 67, which is a razor blade as a rule, i.e. about 0.1 mm. in width. In both parts of the trimming die 5, 6, i.e. at both sides of the transverse slot 7 a few rows of openings are formed containing, on the one hand, the holes 8 for punching the feed holes 8', on the other hand the holes 9 for punching the code holes 9' in a punch tape as in FIG. 3a. The spacing between two rows of holes 8, 9 placed next to the transverse slot 7 at both its sides equals the spacing of characters in punch tape 10 or its full multiple. The width of the trimming plates equals the width of the punch tape. In both parts 5, 6 of the trimming plate the guiding pins 11, 12, 13, 14 (FIG. 12) are fixed with a diameter correspondingly with the diameter of feed holes 8' in punch tape 10.

The spacing between the guiding pins 11, 12, 13, 14 corresponds to a full multiple of the spacing between two adjacent rows 8, 9. All guiding pins, 11, 12, 13, 14 lie on a (unillustrated) common axis of holes 8 on the trimming die. At both ends of base 1, in its longitudinal direction, the guides 16, 17 for the rough guiding of punch tape 10 are fixed by means of screws 15. Under the trimming die in base 1 an opening 73 is formed, under which in the space produced by a bend of the base 1 the drawer 23 is placed serving to accumulate scrap resulting from punching the punch tape 10. At the side of base 1 two brackets, of which one is shown at 24, are placed, such brackets bearing a common rotatable pin 26 extending along the base 1. In the middle portion of pin 26 a lever 27 is swingably accommodated, such lever bearing a holder 66 carrying the cutter 67, i.e. a razor blade which is fixed by means of the screw 68. The lever 27 is terminated by a grip 69. The edge of the cutter 67 is oriented to the transverse slot 7. At both sides of lever 27 at the common pin 26 holders 35, 36 for punch tape 10 are swingably arranged. The punch tape holders 35, 36 are held in the swung position against the action of springs (not illustrated) arranged upon the common pin 26 by catches 39, 40 which are swingably supported by pins 37, 38. The catches 39, 40 are pushed into engagement with the holders by springs 41, 42. Holder 35 carries a bearing 45 in which a pin 47 is located in parallel with the transverse slot 7.

On the pin 47 a lever 70 is swingably mounted with the tiltable plate 28' fixed by means of screws 103. On the lever 70 the clipping cutters 71, 72 for the adhesive tape 53 are further fixed by means of screws 102, said cutters being oriented to the edges of the trimming die and into the openings 73 under the trimming die. In the tiltable plate 28' the guiding holes 30 serve for the holes 9 of the trimming die and the guiding holes 29 (see FIG. 14) for the hole 8 of the trimming die into which the punches 106 engage.

With the tiltable plate 28' swung down, the guiding holes 30 are coaxial with the adjacent holes 9 of the trimming die. At the upper side of the tiltable plate 28', the groove 104 is formed leading across all guiding holes 29. The heads 105 of punches 106 are placed in groove 104, such punches enter the guiding holes 29 and protrude at the lower side of the tiltable plate 28'. The rectangular form of heads 105 prevents the punches 106 from turning.

The punches 106 are protected against turning by means of the shim 107 which is fixed to the tiltable plate 28' by means of screws 108. The cutting plate of punches 106 is biased so as to be sloping in the direction of the axis of rotation of the lever 70. In order to facilitate punching, i.e. in order to punch with less force, the punches have different lengths. Punching is thus distributed over a longer stroke of the lever.

The punches 106 are accommodated in the plate 28' with little axial and radial clearance in order to facilitate the entering of punches 106 into the holes 8 of the trimming die. Between both catches 39 and 40 on pin 31, the catch 32 is tiltably arranged and pushed by means of the spring 34 into engagement with the tiltable plate 28' which is thus held in the swung down position against the action of spring 50 on the pin 47. At the same side of the base 1 at the common pin 26, there is a holder 51 fixed in front of the lever 27, said holder bearing the rotatable roll 52 of adhesive tape 53. The adhesive tape 53 is fed over the roller (not illustrated) rotatably placed on pin 55 fixed by the aforesaid brackets of which one is designated 24, and further over the adjustable cutter (not illustrated) for cutting the adhesive tape 53 in a longitudinal direction The free end of adhesive tape 53 projects between the trimming die and the plate 28 with the guiding holes 30. The adjustable cutter is controlled by a control wheel 56 fixed at the protruding end of the common pin 26.

Figure 14:
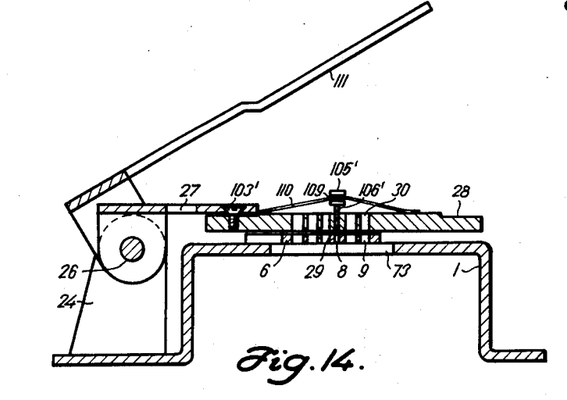
FIG. 14 is a view in vertical transverse section through a tenth embodiment of device according to the invention, the view showing an alternative arrangement of punches.

In an alternative embodiment according to FIG. 14 the tiltable plate 28 is fixed on lever 27 by means of screws 103', said lever having guiding holes 30 for the holes 9 of the trimming die and guiding holes 29 for the holes 8 of the trimming die. The guiding holes 29 are slidably entered by punches 106', their heads 105' being provided with a recess 109 serving to fix the punches 106' in the reciprocating spring 110 over the plate 28. The reciprocating spring 110 is a flat spring the one end of which is fixed to the lever 27, whereas the other bears against the plate 28. Over the heads 105' of the punches 106' the thrust lever 111 is tiltably accommodated on the common pin 26.

Figure 15:
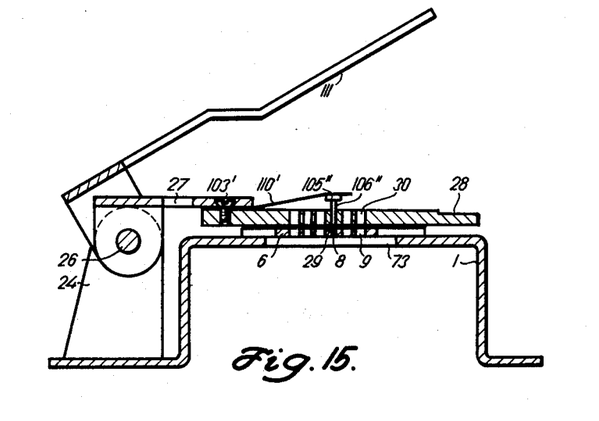
FIG. 15 is a view similar to FIG. 14 of an eleventh embodiment of the device according to the invention, the view showing an alternative arrangement of punches.

In an alternative embodiment according to FIG. 15, the punches 106" are located with their heads 105" under the reciprocating spring 110. The arrangement of punches according to FIG. 14 or 15 can be applied to the embodiment according to FIG. 11, as well as in the various different alternative embodiments according to FIGS. 1–10.

The various described embodiments of the device operate as follows:

One of the possible processes when repairing a punch tape on a device in an embodiment according to FIGS. 1, 2, 3a, 3b is as follows: The catches 39, 40 are released from engagement with the holders 35, 36, the holders then being tilted through the action of springs 43, 44. Further, the catch 32 is also released from engagement with the plate 28, which is tilted as well. Two punch tapes 10 which are to be spliced are inserted into guides 16, 17 so as to overlap. The exact position of both ends of punch tapes 10 is determined by the guiding pins 11, 12, 13, 14 which enter the appropriate holes 8' of the punch tapes 10. Both holders 35, 36 are tilted and fixed in position by catches 39, 40. Then the thrust member is pushed down by one hand, i.e. the plate 48 to the punch tape 10 at the place of the cut. The other hand sets the cutter in the handle to the guiding edge 49 of the thrust member. The ends of both punch tapes 10 are cut by means of shifting the cutter swung down to the trimming die, while its edge enters the transverse slot 7.

When releasing the pressure upon the thrust member, which is tilted through the action of spring 50, the cut pieces of punch tape 10 are removed. Now a piece of adhesive tape 53 is unwound from the supply roll 52 over the whole width of the punch tape 10, laid upon the punch tape 10 at the place of splicing, and pressed down by hand. The overlapping parts of the adhesive tape are clipped off with the cutter in the holder. The side edges of the trimming die, to which the cutter is fed by guiding angle plates 19, 20, 21, 22 serve as cutting edges.

When a narrower strip of adhesive tape 53 is sufficient to stick the punch tape, then one of the cutters 58, 59 is set into the path of the adhesive tape 53 and cuts the adhesive tape during its unwinding. As can be seen from FIG. 3a, both cutters 58, 59 can be set out of operation by turning the control wheel 56.

Repunching the spliced place of punch tape 10 is carried out so that the lever 27 with the plate 28 is tilted to the punch tape 10 and fixed in position by the catch 32. The required code holes 9' and all feed holes 8' are punched into the tape 10 by hand punches. The process of punching is carried out by inserting the hand punch into the guiding holes 29, 30 and by pushing them down to the guiding holes 8, 9 in the trimming die. After the lever 27 is swung out together with both holders 35, 36, the punch tape 10 is taken out of the device. The punching trash falls to the drawer 23 which can be taken out and emptied. As has already been mentioned, any of these operations can be carried out in an arbitrary order without having to transfer the punch tape 10 to some other place.

In the embodiments according to FIGS. 4, 7, 8, and 10, the cutting of punch tape can be performed by one single movement of lever 27. The thrust plate 94 (FIG. 7) serves for the better holding of tape 10 and for the protection of the operator against injury which might be caused by the edge of the cutter 67. The overlapping ends of the adhesive tape 53, in the embodiment of FIG. 4, is carried out by clipping cutters 71, 72 in swinging down the lever 70 with the plate 28'. In other respects the operations in repairing punch tape 10 are the same as in the preceding case. The thrust plate 94' in an embodiment according to FIG. 10 serves also as a plate with guiding holes 29, 30 for the holes 8, 9 of the trimming die.

The source of light 79 illuminates the holes 8, 9 in the trimming die, as well as the guiding holes 29, 30 in the plate 28, and possibly also 28', and 94', provided the holes 8, 9 are punched in tape 10. This measure serves to control the punched code combinations. The drawer 23 is made of translucent material so that it may not block light from the light source. The sloping inner back wall 93 of the drawer 23 serves to remove punching trash while not preventing the holes 8, 9 of the trimming die from being illuminated (FIG. 6).

By shifting the sliding member 80 (FIG. 6) to the stop 88 the guiding pins 11, 12, 13, 14 are shifted so as to have their positions correspond with the position of punch tape 10 with respect to the holes 8, 9. The position of the guiding pins 11, 12, 13, 14 is secured by means of guiding pins 12, 13 entering the holes 91, 91', and possibly 92, 92' in plate 28 with guiding holes 29, 30. When repairing the punch tape 10, the axis of the code holes of which is identical with the axis of the feed hole, the guiding pins 12, 13 enter the fixing holes 92, 92'. When repairing punch tape 10, the axis of the code holes of which is not identical with that of the feed hole, the pin 12 enters the guide hole 92 and the pin 13 enters the guide hole 92'; this takes care of the case when the feed holes 8' are punched. During the operation of punching the code openings, the pin 12 enters the fixing hole 91 and the pin 13' enters the fixing hole 91'. The spacings of the fixing holes 91, 92, as well as the spacing of the fixing holes 91', 92' equal, in this case, the spacings of the rows of characters increased by the amount of misalignment of the feed hole 8' with respect to the row of code holes 9'.

The overlapping portions of adhesive tape 53, in the embodiment according to FIG. 9, are removed by shifting the slide member 100 carrying the slipping cutter 71', 72'.

The process of repairing the punch tape in the embodiment according to FIGS. 11, 12, and 13 differs from the above in that the adhesive tape covered feed holes 8' in punch tape 10 are punched when the plate 28' is in the swung down position. When the required code openings 9' into punch tape 10 are punched, the tiltable plate 28' is swung out. After both holders 35, 36 have been tilted out, the repaired punch tape 10 can be taken out of the device.

In alternative embodiments according to FIGS. 14 and 15, the feed holes 8' in punch tape 10 are punched by the pressure of the thrust lever 111, possibly by pressing the thumb upon the heads 105', (and possibly 105") of the punches 106' or 106". In the embodiment according to FIG. 14, the punches 106' are pulled out of the holes 8 of the trimming die through the action of the reciprocating spring 110. In the embodiment according to FIG. 15, the punches 106" are pulled out of the holes 8 by the swinging out of the lever 28.

Although the invention is illustrated and described with reference to a plurality of preferred embodiments thereof, it is to be expressly understood that it is in no way limited to the disclosure of such a plurality of embodiments, but is capable of numerous modifications within the scope of the appended claims.

What is claimed is:

1. A device for repairing punch tape provided with code holes and feed holes, said device comprising a base, at least two guide pins for the feed holes of the punch tape, holders on the base for the punch tape, a die on the base for trimming the code holes and the feed holes of the punch tape, a hand punch for punching the code holes, a tiltable plate with guide holes for the holes of the trimming die engaging with said hand punch, at least one punch for punching the feed holes, said trimming die comprising a transverse slot along each side of which at least one row of holes are disposed for punching the code holes and the feed holes of a punch tape, the spacing between both rows of holes disposed next to the transverse slot equalling $X \cdot S$, where S equals the spacing of characters of the punch tape, and X is an integer.

2. A device according to claim 1 comprising guide member fixed at one end of the base in its longitudinal direction.

3. A device according to claim 1, comprising a slide member slidably located under the trimming die, fixed guide pins on said slide member projecting into oblong openings in the trimming die, at least one adjustable stop for limiting the path of the sliding member, and a plate with guide holes provided with fixing holes for receiving at least some of the guide pins.

4. A device according to claim 1, comprising a pin disposed at one side of the base, at least one cutter rotatably mounted on said pin, the edge of the cutter overlapping the diameter of rotatable guiding rollers which are located on both sides of the cutter coaxial therewith, each roller being provided with a collar, the distance between said collars corresponding with the width of adhesive strip, a holder for a source of supply of adhesive strip, adhesive strip guiding rollers between the trimming die and the plate which is provided with said guiding holes, and a control wheel with a resilient pawl is fixed at the end of the pin upon which the cutter is mounted whereby selectively to change the angular position of the edge of the cutter and thus the length of the adhesive strip cut thereby.

5. A device according to claim 4, wherein the width of the trimming die corresponds with that of the punch tape, comprising a clipping cutter for the adhesive strip, and wherein the side edges of the trimming die forming cutting edges for the clipping cutter of the adhesive strip.

6. A device according to claim 1, comprising a first lever tiltably mounted on the base, a holder with a cutter mounted on the lever, the edge of the cutter being oriented to enter the transverse slot of the trimming die, a plate with guiding holes for the holes of the trimming die, said plate being swingably arranged on one of the holders, and a second lever, a thrust member on the second lever, the thrust member being spring biased with respect to the first lever and carried with it, the edge of the cutter entering an elongated slot in the thrust member.

7. A device according to claim 1, comprising a plurality of punches, guiding holes for accommodating said punches and serving to punch the feed holes of the punch tape, a punch-mounting plate with low axial and radial clearance, and means for holding said punches from dropping out of said plate.

References Cited

UNITED STATES PATENTS 3,533,885  10/1970  Gustafson ___________ 156—505

FOREIGN PATENTS 618,865  3/1949  Great Britain ________ 156—505
623,734  7/1961  Canada ____________ 156—505

PHILIP DIER, Primary Examiner

U.S. Cl. X.R.

156—513